Sept. 4, 1956 C. J. GREINER ET AL 2,761,505
APPARATUS FOR SEPARATING CONNECTED STACKS OF SHEET MATERIAL
AND TRANSPORTING AND TURNING THE SEPARATED STACKS
Original Filed Jan. 13, 1950 8 Sheets-Sheet 1
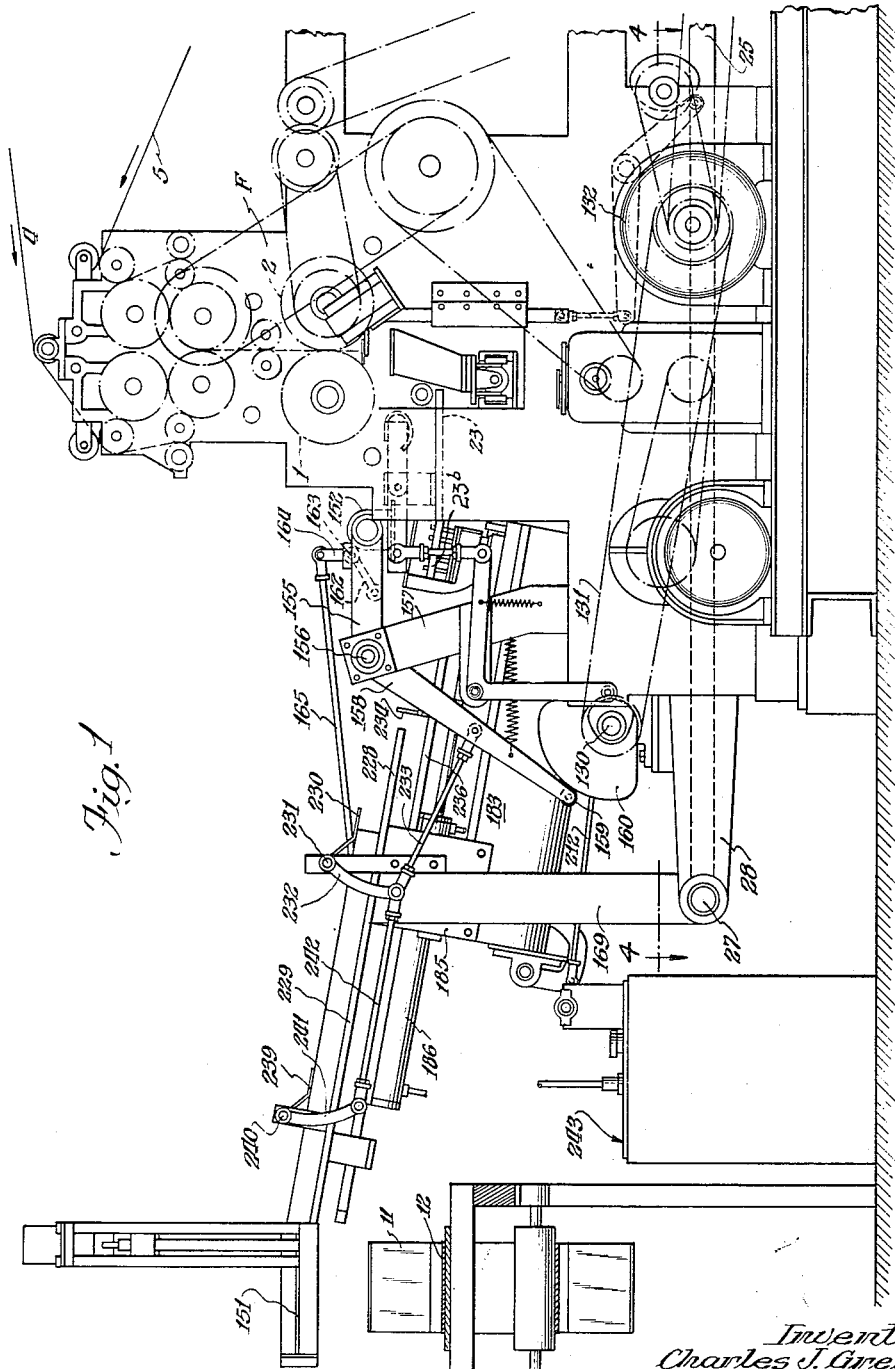
Inventors
Charles J. Greiner
Reinhardt N. Sabee
By: Evans, Glaister & Andwin
Attys

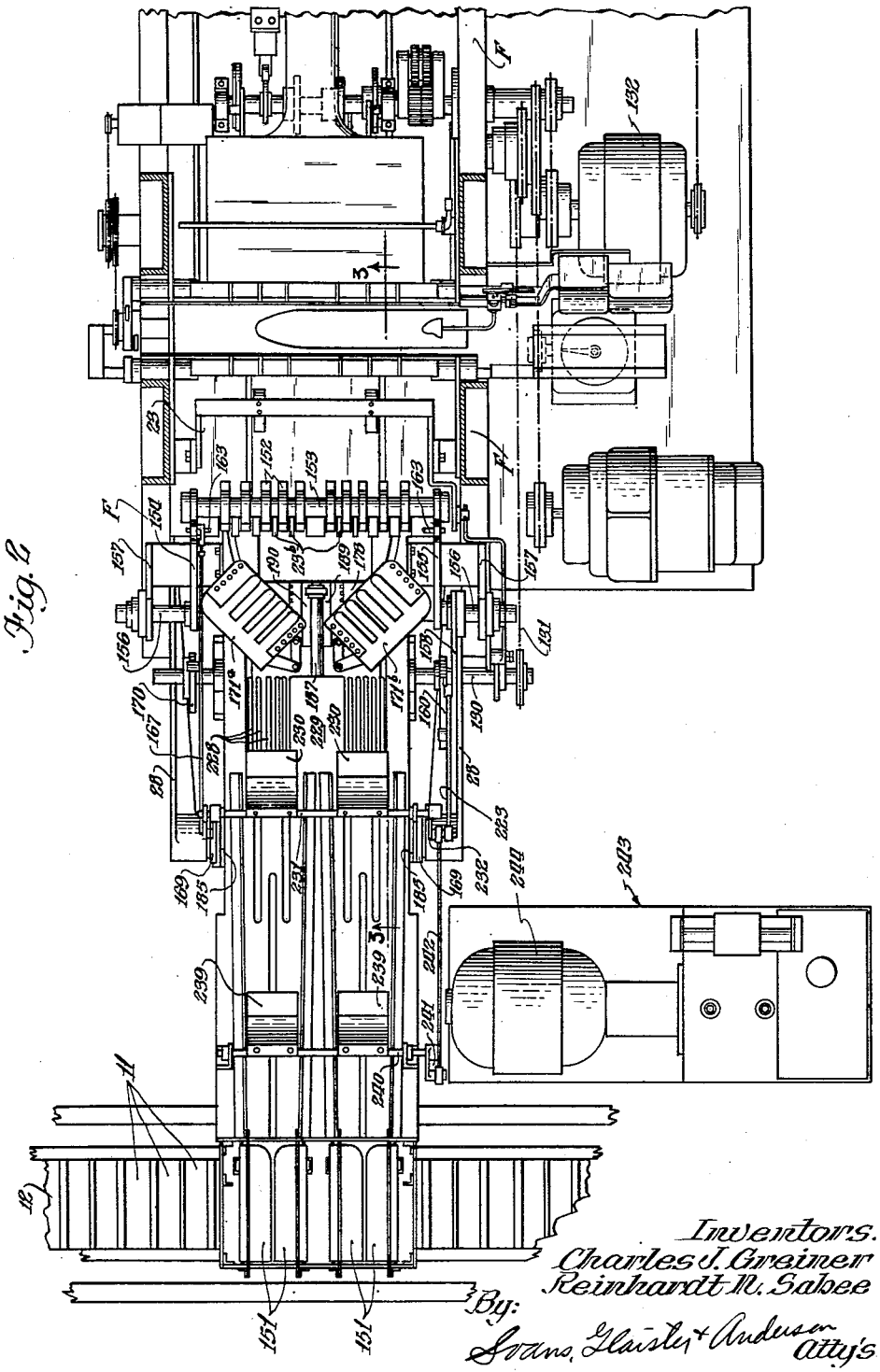

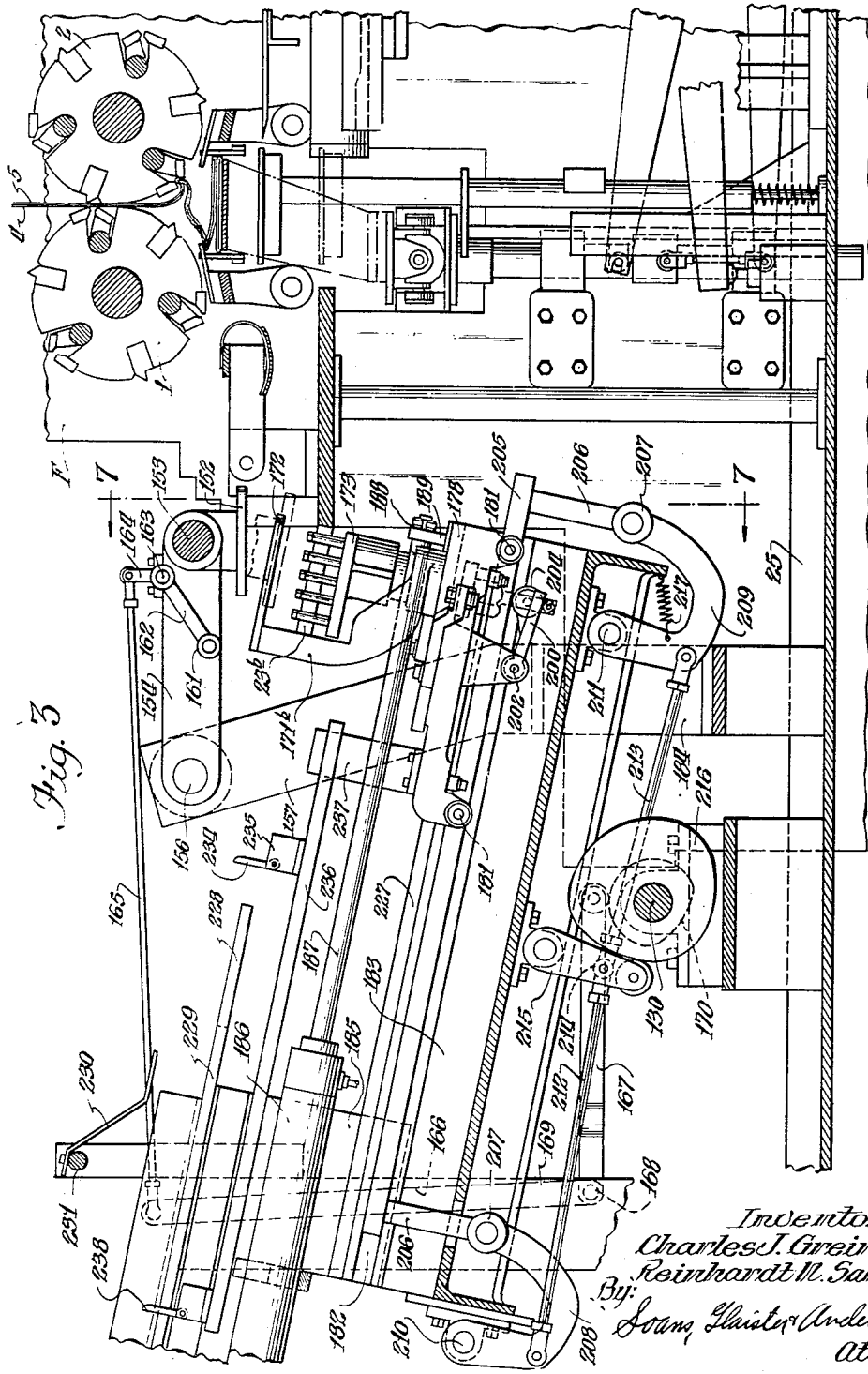

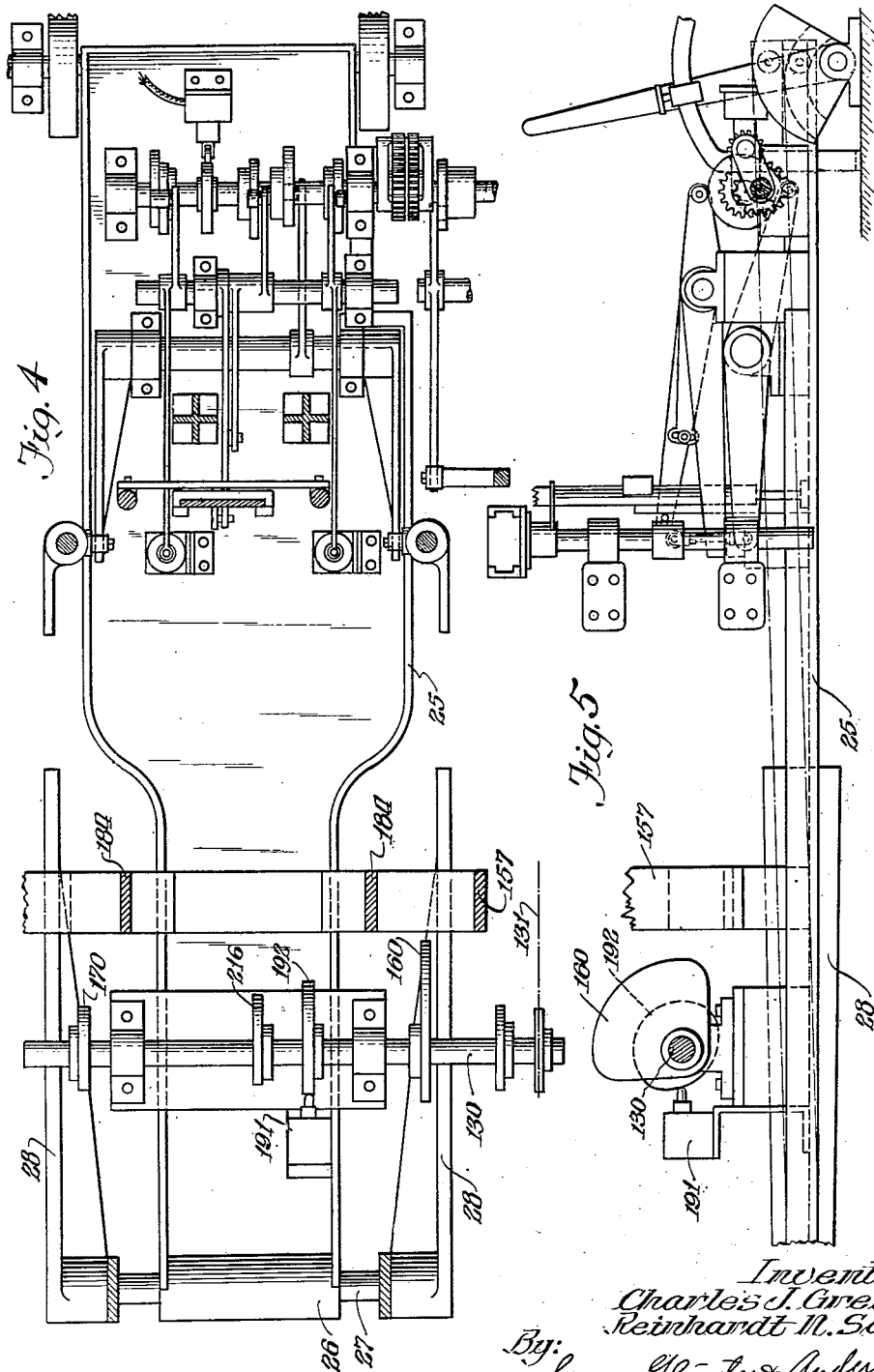

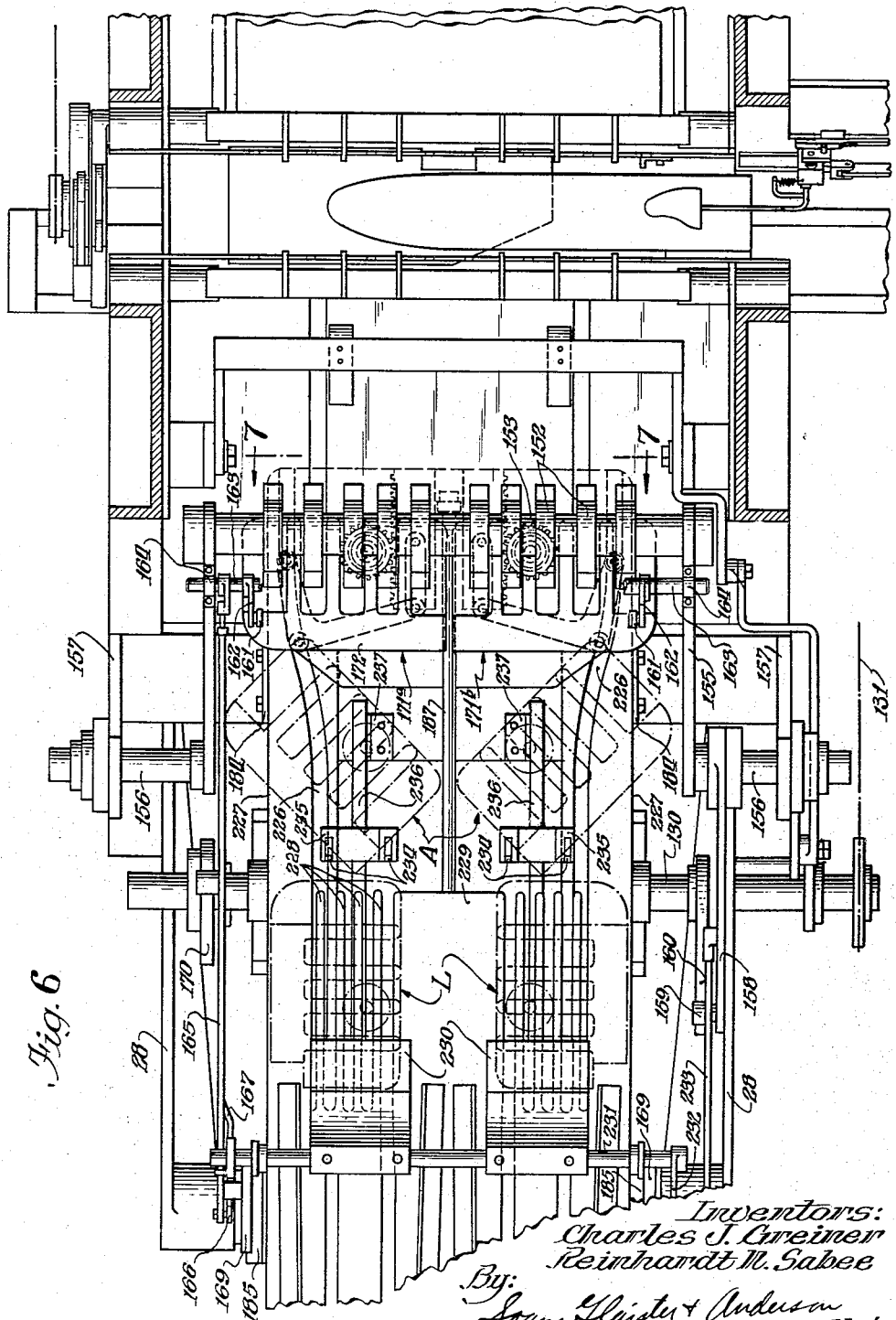

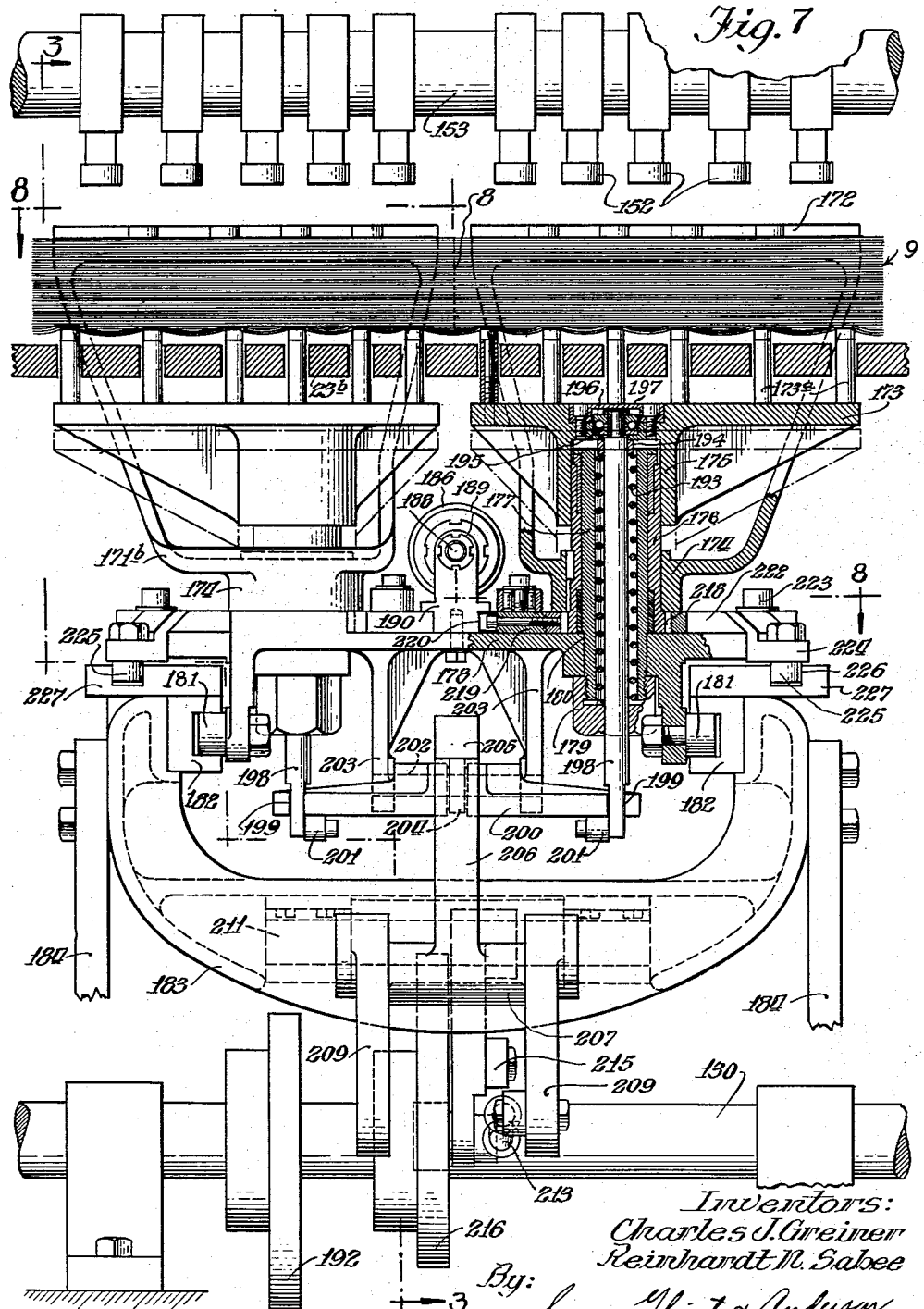

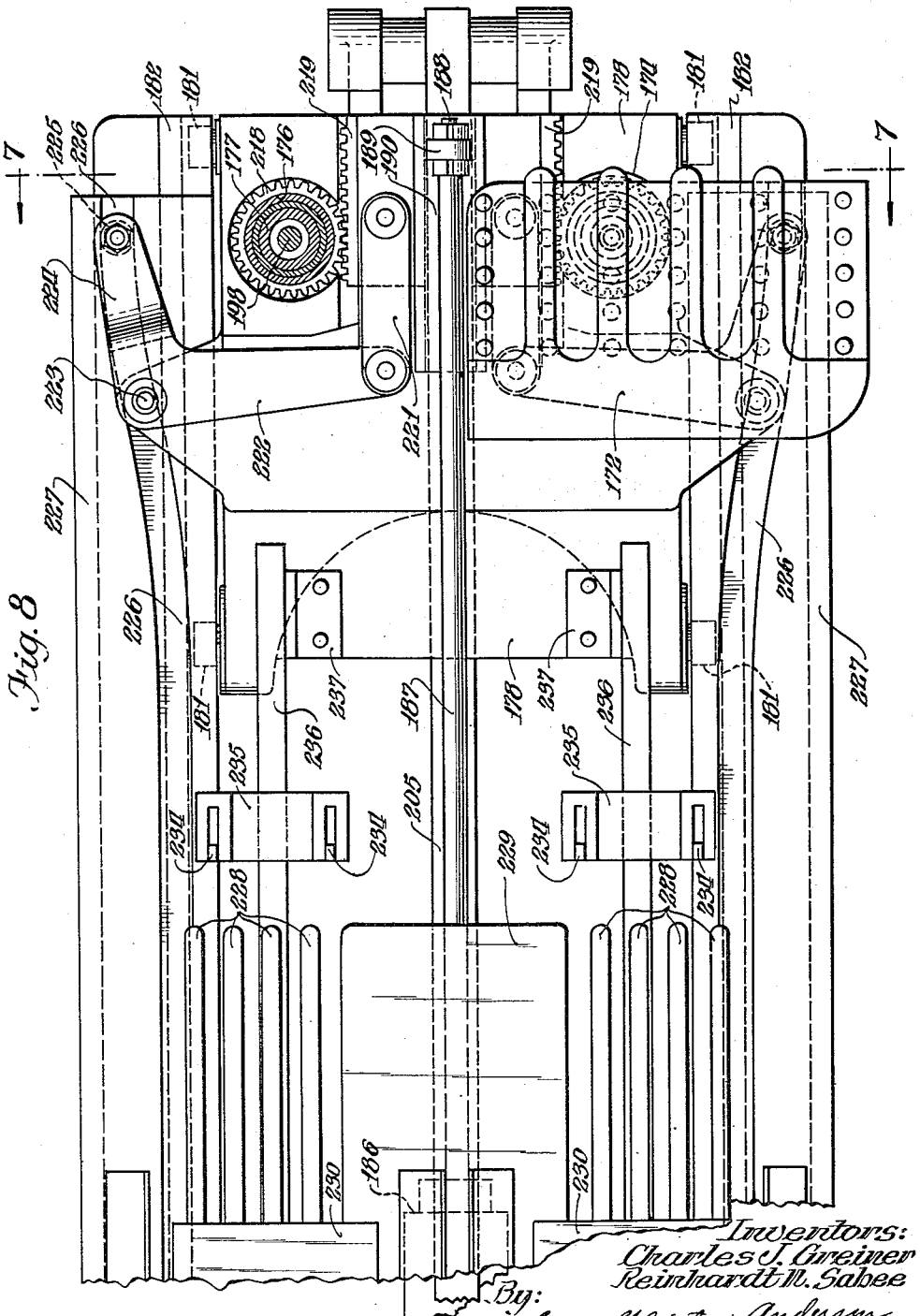

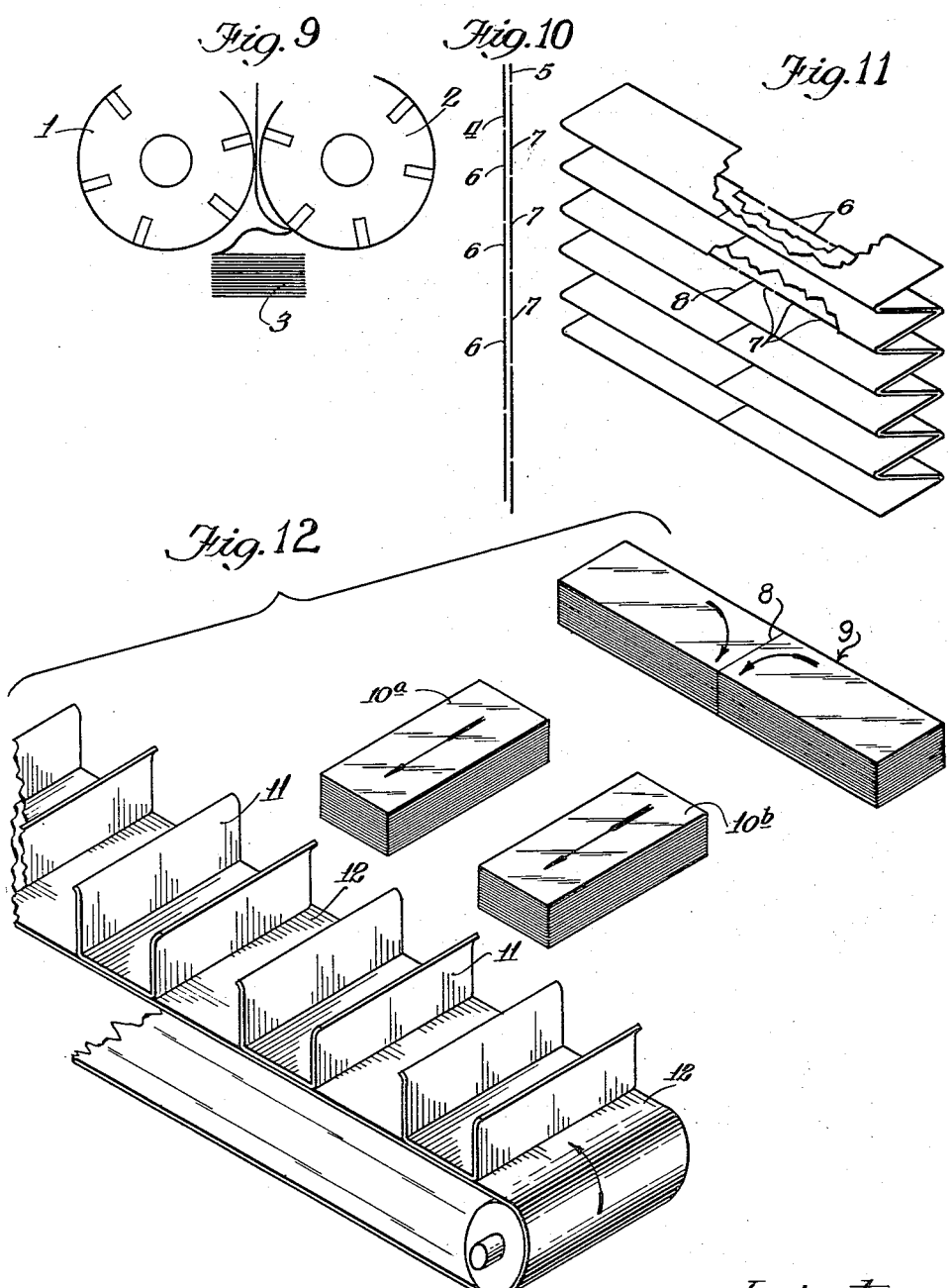

United States Patent Office 2,761,505
Patented Sept. 4, 1956

2,761,505

APPARATUS FOR SEPARATING CONNECTED STACKS OF SHEET MATERIAL AND TRANSPORTING AND TURNING THE SEPARATED STACKS

Charles J. Greiner, Menasha, and Reinhardt N. Sabee, Appleton, Wis., assignors, by mesne assignments, to Kimberly-Clark Corporation, a corporation of Delaware Original application January 13, 1950, Serial No. 138,502, now Patent No. 2,675,747, dated April 20, 1954. Divided and this application June 16, 1953, Serial No. 361,996

15 Claims. (Cl. 164—84.5)

This invention relates to apparatus for separating connected stacks of sheet material and transporting and turning the separated stacks, and in this application, the invention is explained as applied to apparatus employed in connection with apparatus which interfolds tissue paper, such as facial tissue, and delivers the interfolded material in bundles or stacks embodying a pair of potential, packageable stacks of such material separably connected in end to end relation. This application is a division of our application Ser. No. 138,502, filed January 13, 1950, now Patent No. 2,675,747.

The main objects of the invention constituting the subject matter of this division, are to provide automatic apparatus for separating elongated, multiple stacks or bundles of material into relatively independent stacks; to provide means for turning the separated stacks so as to present the stacks in predetermined position for discharge from the apparatus; to provide efficient automatic mechanism for producing stacks of tissues ready for packaging in a box or other enclosure; and to provide such mechanism which will operate continuously in cycles so as to convert the multiple-stack output of an interfolding or other machine into independent stacks.

Other objects and advantages of the invention will be understood by reference to the following specification and accompanying drawings (8 sheets) wherein there is described and illustrated a typical embodiment of an apparatus for attaining the abovementioned objects.

In the drawings,

Fig. 1 is a side elevation;

Fig. 2 is a plan;

Fig. 3 is a longitudinal cross section approximately on the plane represented by the lines 3—3 of Figs. 2 and 7;

Fig. 4 is a plan section on a plane approximately represented by the line 4—4 of Fig. 1;

Fig. 5 is a side elevation of the mechanism illustrated in Fig. 4;

Fig. 6 is a fragmentary plan corresponding to a portion of Fig. 2 but on a somewhat enlarged scale;

Fig. 7 is a vertical cross section on the line 7—7 of Figs. 3 and 6;

Fig. 8 is a plan section on the line 8—8 of Fig. 7;

Figs. 9, 10, 11, and 12 are diagrammatic illustrations representing the preparation of one type of material which is made into stacks ready for packaging, and the general mode of operation of the mechanism according to the present invention.

Referring now to the drawings and, first, to Figs. 9, 10 and 11 a pair of interfolding rolls are represented at 1 and 2 which are driven continuously at high speed and which function to Z-fold and interfold two webs of tissues so as to continuously add to the top of a stack 3 of folded and interfolded tissues. The interfolding rolls 1 and 2 receive two webs of tissue material such as represented at 4 and 5 in Fig. 10. These webs are slit transversely as indicated at 6 and 7, this slitting being interrupted by only slight bonds which are permitted to remain for the purpose of holding the sheet sections in continuous web form. These bonds are quite weak and are easily broken when desired, thereby facilitating separation of sections of the respective webs from the supply webs. As indicated in Fig. 10, the slits 6 in the web 4 are disposed in staggered relation to the slits 7 in the web 5, the slits 6 being located about midway between the slits 7. When these sheets are interfolded by the action of the rolls 1 and 2, the slits 7 will occur within the fold of the sections of the web 4 and, similarly, the slits 6 will occur within the folds of the sections of the web 5. This relationship is indicated in Fig. 11.

For economical operation and for certain practical reasons, it is advantageous to fold webs 4 and 5 having a width twice that of the desired width of the tissues when packaged. Accordingly, the webs are slit longitudinally so that in the interfolded condition of the webs represented in Fig. 11, there will occur a line of severance indicated at 8, which extends continuously of the lengths of the webs 4 and 5 and transversely of the folded material. The slitting 8 is continuous and is practically complete but nevertheless slightly imperfect (or predetermined small bonds may be permitted to remain) so that the web portions of opposite sides of the slitting 8 remain very weakly bonded together. The folded tissues discharged from the apparatus represented in Fig. 9, will be in the form of an elongated, double length stack 9 (Fig. 12) which is divided by the slitting 8 into two sections which may be broken from each other.

By the apparatus disclosed in our said application Serial No. 138,502, double length stacks 9 of tissues are discharged as rapidly as they are produced by the interfolding mechanism, the stacks being fed laterally and then broken at the transverse severance 8 into separate shorter stacks 10a and 10b, these stacks being turned 90° in the operation of breaking the stack 9 and then fed endwise as indicated by arrows on said stacks 10a and 10b in Fig. 12. The stacks are fed endwise and delivered by suitable means into pockets or carriers 11 on a conveyor 12 by which the individual stacks 10 are propelled sidewise to another station or, for example, to mechanism for inserting the same into a box.

Mechanism forming part of the interfolding machine is operative to deliver the separably connected tissue stacks into position on the upwardly inclined slotted end portion 23b of the table 23 (see Figs, 1, 2 and 3) in which position the double stack is gripped and then advanced and broken into two separate sections as indicated at 10a and 10b in Fig. 12. From the angularly, upwardly extending slotted portion 23b of the table, the tissue stacks are carried along an upwardly inclined path in continuation of the inclination of said slotted table portion so as to ultimately deliver the stacks at a predetermined elevation above the conveyor 12 (Figs. 1 and 2) thereby to permit dropping of the stacks on gate mechanisms 151 in overlying relation to the conveyor 12. The tissue stacks deposited on the gate pairs 151 may successively be dropped into the pockets or carriers 11 on the conveyor 12 by opening the gates 151. Suitable mechanism is provided for automatically opening the gates in timed relation to the travel of the pockets so that the tissue stacks will fall into the conveyor pockets. This mechanism is not a part of the present invention, and, therefore, will not be described in detail. It will, however, be observed that the gate structure 151 is at a substantial elevation above the plane of the table 23 wherefor the tissue stacks are carried along an upwardly inclined path of travel as already referred to.

When a stack of tissues reaches the slotted table portion 23b, pressure devices or holding bars 152 (Figs. 3 and 7) are lowered into engagement with the top surface of the stack to slightly compress the stack and temporarily hold it in place on the slotted table portion. The pressure members 152 are of narrow elongated form extending transversely of and carried by a cross shaft 153 which is fixedly mounted in the ends of a pair of rock arms 154 and 155 (see also Fig. 6). These rock arms are pivoted at their other ends by means of shafts 156 on suitable bracket arms 157 which extend upwardly from a pivoted bottom shelf 25 as indicated in Fig. 3. The shelf 25 is pivotally mounted at one end as shown at 26 and 27 in Fig. 4 on bracket arms 28 which are rigid with the main supporting frame structure F. The other end of said shelf is suitably adjustably supported for purposes explained in our said application. The arms 154 and 155 together with the holding members 152 are adapted to be rocked so as to move the holding members toward and from the tissue stack. For imparting the required rocking movement to said holding members 152, the pivot shaft 156 for the arm 155 has secured to it a lever 158 (Figs. 1 and 2) which extends downwardly and is provided at its free end with a roller 159 for engaging the peripheral cam surface of a rotary cam 160. This cam 160 is secured to a cross shaft 130 which is driven by a chain 131 from an electric motor 132. The pressure members 152 are vertically aligned with the finger-like portions of the slotted table end portion 23b as shown in Fig. 7 so that the tissue stack will be effectively compressed when said pressure members are lowered.

Tissue material when interfolded into stacks as herein described, tends to dip in the center of the folding at the edges, the folds being of more or less round character rather than sharp creases so that when the tissue is unfolded for use it will be free of any hard fold-line. Because of this characteristic of a tissue stack (or possibly because of some other reason) the leading edges of the top sheet or sheets, tend to curl back on the stack. To prevent such curling before the holding members 152 engage the stack, there are provided a plurality of wiping rolls 161 (Figs 3 and 6) disposed at suitable intervals across the apparatus, these wiping rolls being rocked forwardly to roll out the leading edge portions of the stacked sheets. These wiping rolls 161 are carried by arms 162 which extend from a shaft 163 which is suitably journaled as indicated at 164 on the rock arms 154 and 155. In these figures, the wiping rolls 161 are illustrated in their advanced position.

For rocking the shaft 163 and the wiping rolls 161, and arm 164 which is secured to the shaft 163, is connected to one end of a link 165 (see Fig. 3), the other end of said link being connected to the upper end of a bell crank arm 166. The bell crank comprising the arm 166 and another arm 167, is pivotally mounted as indicated at 168 on a post 169 which is pivotally supported at its lower end on the pivot shaft 27 (see Fig. 1). Said post 169 is one of a pair of such posts which serve to support other elements which will presently be referred to. The bell crank arm 167 has a roller at its free end (Fig. 3) for operatively engaging a rotary cam 170 on the shaft 130, whereby said bell crank is rocked. The link 165 is of considerable length as compared with the length of the rock arms 154 and 155 so that the movement of the shaft 163 about the pivot axis of the arms 154 and 155 does not significantly effect the movement imparted to the rollers 161 by the movement imparted to the rollers 161 by the described cam actuated bell crank and link connections. In any event, the extent of movement of the wiping rollers 161 is not critical and requires no highly accurate setting of the starting and stopping positions thereof.

For gripping the two sections of the table stack of tissues which are clamped by the pressure members 152 against the slotted portions 23b of the table, there are provided two gripping devices designated in their entireties by the reference numerals 171a and 171b (Figs. 2 and 3), these devices being alike except that they are made right and left-hand. The following explanation of the structure and operation of the gripper 171a will therefore be understood as being also applicable to the gripper 171b with proper regard for the fact that one is of the opposite hand relative to the other. These jaw structures are moved laterally along an inclined plane so that they are operative to grip tissue stacks clamped by the members 152 on the slotted table portion 23b and carry the stacks upwardly toward the gate structure 151.

The gripping devices each comprise (Figs. 3 and 7) an upper jaw 172 and a lower jaw 173. The upper jaw 172 is of slotted plate-like form so as to provide fingers which may be moved into straddling relationship to the pressure members 152 (as indicated in Fig. 6) when the pressure members 152 are in their stack clamping position as shown in dotted lines in Fig. 3.

The jaw members 172 and 173 have hubs 174 and 175 (Fig. 7) respectively, which are secured to a sleeve 176 and this sleeve 176 is rotatably supported on a tubular post 177 which is anchored in a slide plate 178. As shown in Fig. 7, the tubular post 177 is clamped in place by means of a nut 179 which is screwed on the lower end of the post below the plate 178 and a shoulder 180 formed on the post for engagement with the uper face of said plate. The clamping jaw structure comprising the upper and lower jaws 172 and 173 is rotatable as a unit about the post 177 and also movable laterally so as to advance the gripped stacks of tissues from the table 23 to another guide table over which the stacks are fed in an endwise direction into said gate means 151 for depositing the stacks one by one on the conveyor 12.

The slide plate 178 is provided with a pair of depending lugs on each side near its front and rear ends, and suitable rollers 181 (see Figs. 3, 7 and 8) are mounted on these lugs in axially horizontal positions. These rollers 181 ride in tracks 182, 182 (Fig. 7) which are elongated in the direction of travel of the jaws. These tracks 182 are fixedly mounted on the opposite upstanding side portions of a U-shaped cradle or bed structure 183, which is supported near one end by supporting posts 184, 184 from the pivoted base shelf 25, and at its other end by the beforementioned supporting posts 169 (Fig. 1). The posts 169 are connected to the cradle structure 183 through the agency of plates 185 which depend from the upper portions of the posts 169 into engagement and attachment with said bed structure 183.

The slide plate 178 supports both jaw pairs as best shown in Fig. 7, so that when the plate 178 is moved lengthwise along the tracks 182 both jaw pairs will be simultaneously advanced.

Movement is imparted to the slide plate 178 by means of a hydraulic cylinder 186 (see Figs. 1 and 3) which is suitably supported by the plates 185 through the agency of such brackets as may be desired for that purpose. A piston rod 187 extending from said cylinder 186 is anchored at its outer or free end as indicated at 188, to a lug 189 which is part of a member 190 (Figs. 7 and 8) which is fixedly secured to the slide plate.

The admission and release of pressure fluid from the opposite ends of the cylinder 186 to reciprocate the piston 187 and the slide plate 178 are controlled by a suitable valve 191 (Figs. 4 and 5) which is actuated by a rotary cam 192 on the driven shaft 130. The cam 192 is, of course, so shaped as to adjust the valve as may be required to effect the desired reciprocation of the piston 187 and parts actuated thereby.

The lower clamping jaw 173 is normally resiliently urged upward toward the overlying jaw 172 by means of a coiled compression spring 193 (Fig. 7). The spring 193 is housed within the post 177 and is compressed between the bottom of the fastening nut 179 and the inner end of a collar 194. The collar 194 bears against the retaining cup 195 of an anti-friction bearing 196 and the upper portion of this cup 195 bears against the lower side or inner end of a cap 197 which is inserted in and secured to the jaw 173.

The jaw 173 is initially held down or in open position with reference to the overlying jaw 172 through the agency of a rod 198 which has its upper end anchored through the agency of said anti-friction bearing 196 to the jaw 173. The lower end of said rod 198 is slidable through a slot 199 in a plate 200 and the lower end of said rod 198 is provided with a roller 201 which bears against the bottom of said plate 200. The plate 200 (see Figs. 3 and 7) is pivoted as indicated at 202 between a pair of lugs 203 which depend from said slide plate 178 and said plate 200 is provided with a roller 204 which engages the under side of a longitudinally extending bar 205. This bar 205 is mounted for up and down movement so that upon downward movement of the bar it will act through the roller 204 to swing the free end of the plate 200 downwardly, thereby to act through the roller 201 and the rod 198 to pull the lower jaw member 173 downwardly or into open position relative to the overlying jaw plate 172.

The jaw opening bar 205 is provided adjacent its opposite ends with depending posts 206 which have their lower ends provided with transversely extending bearing bosses 207. The bosses 207 are disposed intermediate pairs of arms 208 and 209 (Fig. 3) and these arm pairs are pivotally mounted as indicated at 210 and 211 respectively on the bed structure 183.

The pairs of arms 208 and 209 are interconnected for simultaneous rocking movement so that the control bar 205 will be moved up and down uniformly throughout its length. The means for interconnecting said arm pairs 208 and 209 comprises a pair of links 212 and 213 which respectively have their outer ends pivoted to one of the arms of the pairs 208 and 209 and their inner or adjacent ends pivotally interconnected and pivotally secured as indicated at 214, to a rock arm 215. This rock arm 215 is pivoted for rocking movement on the under side of the bed structure 183 and has its lower or free end provided with a roller for operative engagement with a rotary cam 216 which is carried by the driven shaft 130.

After a stack of tissues is delivered into inclined position on the fingered or slotted portion 23b of the table 23, the pairs of jaw structures move downwardly or toward the right (in Fig. 3) until the upper and lower jaws are disposed above and below the tissue stacks. The jaws are, of course, in open position when they move into initial stack embracing position; they are shown in closed or stack clamping position in Figs. 3 and 7. The cam 216 then permits a spring 217 (Fig. 3) to rock the arms 208 and 209 so as to cause the jaw control bar 205 to move upwardly, thereby permitting the springs 193 (Fig. 7) of the jaw structures to move the lower jaws 173 upwardly to raise the tissue stacks from the slotted table portion 23b into clamping engagement with the respective overlying jaws 172.

As gripping of the tissue stacks is effected, the valve 191 (Figs. 4 and 5) is actuated to initiate forward and upward movement of the jaws, the jaws are turned 90° about the axes of their mounting posts 177 to effect separation of the double tissue stack into two separate stacks and to turn the separate stacks through oppositely directed arcs of 90°, thereby to position the separate stacks for endwise travel along parallel but spaced paths of travel.

The mechanism for effecting turning of the jaws as an incident to their forward movement comprises (Figs. 7 and 8) a gear 218 formed on or secured to the lower end of the jaw mounting sleeve 176, this gear being engaged by a rack 219 which is slidable on the slide plate 178. The rack 219 is guided at one side by a guideway 220 formed on the adjacent side of the member 190 and at the other side by a shoulder of the slide plate 178 as will best be understood by inspection of Fig. 8. The rack bar 219 is connected by means of a link 221 to the free end of one arm 222 of a bell crank which is pivoted as indicated at 223 on an ear or lug extending from the slide plate 178. The other arm 224 of said bell crank is offset downwardly and is provided with a depending roller 225 which rides in a cam track 226 which is provided in a normally fixed track bar 227 which is mounted on said cradle member 183.

By reference to Fig. 8, it will be seen that as the slide plate 178 moves endwise toward the left, the cam track 226 will act on the roller 225 to rock the bell crank arms 224 and 222 shown in full lines in Fig. 8, in a clockwise direction thereby to advance the rack 219 relative to the slide plate. The gear 218 shown in full lines, is thereby rotated in a clockwise direction as viewed in Fig. 8. Both pairs of stack gripping jaws are rotated from the transversely extending starting position as shown in full lines in Fig. 6, to angular position indicated at A in Fig. 6 and ultimately to the parallel lengthwise extending position indicated at L in said Fig. 6. This turning movement is restricted or is not effected during the initial portion of the lateral movement of the jaws so as to permit the upstanding clamping pins 173a of the lower jaws to be moved freely out of the slots of the table portion 23b.

Due to the right and left-hand arrangement already mentioned, the jaw pairs 171a and 171b will turn in opposite directions. Accordingly, the double stack of tissues will be broken and separated into two separate stacks disposed in transversely spaced, longitudinally extending positions as indicated at 10a and 10b in Fig. 12.

When the jaw pairs have moved to their extreme left-hand position, that is to say, to the position L of Fig. 6, the tissue stacks carried by the jaws will be disposed over fingered portions 228 of another inclined table 229 which is suitably supported by attachment to the plates 185 and posts 169 (see Figs. 1 and 3). The fingers 228 receive between them, the jaw pins 173a whereby the tissue stacks may be delivered to positions over said fingers preparatory to depositing the stacks thereon. The jaws are opened when in their discharge position at L in Fig. 6, and begin their retractive or return movement, leaving the tissue stacks on the table fingers 228. To hold the stacks on the said fingers, that is to say, to prevent the tissue stacks from returning with the jaws, there are provided gripper members 230 (Figs. 1, 3 and 6) carried by a rock shaft 231 which is journaled in suitable upstanding supports carried by the side plates 185.

The rock shaft 231 is actuated by means of an arm 232 secured to and extending laterally from the rock shaft and a link 233 which connects the free end of said rock arm 232 to a portion of the rock lever 158 as best shown in Fig. 1. The cam 160 is so shaped that it acts through the arm 158, the link 233 and rock arm 232 to hold the tissue gripping members 230 in their gripping positions during the retractive movement of the jaw pairs and until just shortly before the jaw pairs reach their fully retracted position in embracing relationship to another tissue stack on the table portion 23b. Just before the jaw pairs reach their retracted position, the cam 160 is caused to rock the arm 158 so as to effect movement of the pressure members 152 into stack compressing position, thereby to facilitate movement of the open jaw pairs into embracing relationship to the tissue stacks. This movement of the pressure members 152 also is accompanied by upward or releasing movement of the grippers 230 whereby the tissue stacks now resting on the finger portions 228 of the table 229 are released. These tissue stacks, although no longer held by the grippers 230 will not normally be caused by the slight angle of the table 229 to slide downwardly but will normally remain in position until they are again positively advanced along said table 229. Any downward sliding of the tissue stacks will, however, be arrested by engagement of the tissue stacks with pairs 234 of feeding fingers (see Figs. 3 and 6) which are disposed immediately adjacent the receiving ends of fingers 228 as shown in Figs. 3 and 6. These feed fingers 234 are pivotally mounted in blocks 235 which are carried by forwardly extending bars 236, the latter being rigidly mounted through the agency of suitable brackets 237 on the slide plate 178. The bars 236 are elongated and have advance sets of feed fingers 238 mounted thereon, the fingers 238 being similar in character to the fingers 234.

It will be seen that when the jaws 172 and 173 begin their advancing movement, the feed fingers 234 and 238 will be correspondingly advanced so that the fingers 234 will be operative to engage and advance the tissue stacks which were previously delivered to the table fingers 228 by said jaw pairs 172 and 173. Similarly, the feed fingers 238 will be operative to advance tissue stacks which were previously advanced by the fingers 234. The fingers 234 and 238 are suitably pivotally mounted and normally yieldingly held in their upwardly extending positions as shown in Fig. 3, so that during retractive movement these fingers may rock about their pivots so as to pass under the tissue stacks resting on the overlying table 229 and fingers 228. As soon as the fingers pass the overlying stacks they spring up to their operative upwardly extending position as shown in Fig. 3.

To temporarily hold advance tissue stacks in place on the table 229, another pair of stack gripping jaws 239 (Fig. 1) is positioned over the table 229 and mounted on a rock shaft 240 which is actuated by connections comprising a rock arm 241 and link 242, to the rock arm 232. Hence, the gripping members 239 will be actuated simultaneously with the gripping members 230.

The tissue stack which is temporarily held in place by the advanced grippers 239 will be fed forwardly to the drop gates 151 as an incident to the forward movement of the next succeeding tissue stacks; the latter will be fed forwardly by the feed fingers 238 into engagement with the preceding stacks whereby said preceding stacks will be moved forwardly into position on said dropping gates 151 by means of which the stacks are deposited on the conveyor 12.

Pressure fluid for actuating the various parts which are hydraulically operated may be supplied from a suitable pump and fluid storage mechanism indicated in its entirety at 243 (Figs. 1 and 2) which is actuated by an electric motor 244. Suitable conduits (not shown) connect the hydraulic pressure unit 243 through the various valves to the said hydraulic cylinders. The described structure is herein illustrated largely in the manner in which it was initially constructed and it is, of course, subject to many refinements and changes while retaining the principles thereof and without departing from the scope of the invention.

We claim:

1. In apparatus of the class described, a receiving table, a discharge table, a carrier mounted for lateral reciprocating movement from said receiving table to said discharge table and back to said receiving table, means for imparting such reciprocating movement to said carrier, a pair of grippers rotatably mounted on said carrier and having jaws adapted to be closed and opened, means for effecting closing and opening of said gripper jaws respectively when the carrier is in predetermined relationship to said receiving and discharge tables, thereby to enable said grippers to grip separably connected stacks of material on said receiving table and to transport said stacks to and deposit said stacks on said discharge table, and means for effecting rotary movement of at least one of said grippers relative to the other intermediate the closing and opening of the jaws thereof so as to cause a portion of such gripper to move away from the other gripper, whereby said stacks of material are separated from each other before being deposited on said discharge table.

2. In apparatus of the class described, a receiving table, a discharge table, a carrier mounted for lateral reciprocating movement from said receiving table to said discharge table and back to said receiving table, means for imparting such reciprocating movement to said carrier, a pair of grippers rotatably mounted on said carrier and having jaws adapted to be closed and opened, means for effecting closing and opening of said gripper jaws respectively when the carrier is in predetermined relationship to said receiving and discharge tables, thereby to enable said grippers to grip separably connected stacks of material on said receiving table and to transport said stacks to and deposit said stacks on said discharge table, and means for effecting simultaneous rotation of said grippers in opposite directions intermediate the closing and opening of the jaws thereof so as to cause initially adjacent portions of said grippers to move away from each other, whereby said stacks of material are separated from each other before being deposited on said discharge table.

3. In apparatus of the class described, a receiving table, a discharge table, a carrier mounted for lateral reciprocating movement from said receiving table to said discharge table and back to said receiving table, means for imparting such reciprocating movement to said carrier, a pair of grippers rotatably mounted on said carrier and having jaws adapted to be closed and opened, means for effecting closing and opening of said gripper jaws respectively when the carrier is in predetermined relationship to said receiving and discharge tables, thereby to enable said grippers to grip separably connected stacks of material on said receiving table and to transport said stacks to and deposit said stacks on said discharge table, and means for effecting rotation of said grippers intermediate the closing and opening of the jaws thereof so as to cause initially adjacent portions of said grippers to be moved away from each other, whereby said connected stacks are separated from each other before being deposited on said discharge table, said means for effecting rotation of said grippers being operative to terminate said rotary movement with the grippers and stacks in rotatively changed positions relative to the receiving table positions of said grippers and stacks, thereby to cause the stacks to be deposited on said discharge table in rotatively changed positions relative to the receiving table positions of said stacks.

4. In apparatus of the class described, a receiving table, a discharge table, a carrier mounted for lateral reciprocating movement from said receiving table to said discharge table and back to said receiving table, means for imparting said reciprocating movement to said carrier, a pair of grippers rotatably mounted on said carrier and having jaws adapted to be closed and opened, means for effecting closing and opening of said gripper jaws respectively when the carrier is in predetermined relationship to said receiving and discharge tables, thereby to enable said grippers to grip separably connected stacks of material on said receiving table and to transport said stacks to and deposit said stacks on said discharge table, and means for effecting rotation of said grippers through arcs of approximately ninety degrees and respectively in opposite directions intermediate the closing and opening of the jaws thereof so as to cause initially adjacent portions of said grippers to move away from each other, whereby said stacks of material are separated from each other and deposited on said discharge table in transversely extending relationship to the positions of the respective stacks on said receiving table.

5. In apparatus of the class described, the combination of receiving and discharge tables having slotted end portions adapted to support stacks of material, a carrier mounted for reciprocating movement from said receiving table to said discharge table and back to said receiving table, means for effecting such movement of said carrier, and a stack gripper mounted on said carrier and comprising upper and lower jaws which are movable relative to each other to and from closed and open positions for gripping and releasing stacks of material, one of said jaws having a stack engaging portion which is movable into the slots of said receiving and discharge tables for engagement with the under sides of the stacks of material while the latter are also supported by portions of said tables on opposite sides of the slots therein.

6. In apparatus of the class described, the combination of receiving and discharge tables each having a material stack supporting portion comprising a plurality of spaced fingers, a carrier mounted for reciprocating movement from said receiving table to said discharge table and back to said receiving table, means for effecting such movement of said carrier, and a stack gripper mounted on said carrier and comprising upper and lower jaws which are movable relative to each other to and from closed and open positions for gripping and releasing stacks of material, the lower gripping jaw comprising a plurality of upstanding, spaced, post-like projections which are movable into the spaces between said table fingers so as to be engageable with spaced portions of the under side of a stack of material resting on said table fingers, and means for effecting opening and closing of said jaws in predetermined relation to the reciprocating movement of said carrier.

7. In apparatus of the class described, a receiving table, a discharge table, a carrier mounted for lateral reciprocating movement from said receiving table to said discharge table and back to said receiving table, means for imparting such reciprocating movement to said carrier, a pair of grippers rotatably mounted on said carrier and having jaws adapted to be closed and opened, means for effecting closing and opening of said gripper jaws respectively when the carrier is in predetermined relationship to said receiving and discharge tables, thereby to enable said grippers to grip separably connected stacks of material on said receiving table and to transport said stacks to and deposit the same on said discharge table, means for effecting rotation of said grippers intermediate the closing and opening of the jaws thereof so as to cause initially adjacent portions of said grippers to move away from each other and said stacks to be thereby separated from each other before being deposited on said discharge table, said tables each having a stack supporting portion comprising a plurality of spaced fingers, and said gripper jaws comprising upper and lower jaws and the lower jaws of said grippers embodying a plurality of upstanding, spaced, post-like projections which are movable into the spaces between said table fingers so as to be engageable with spaced portions of the under side of a stack of material resting on said table fingers.

8. In apparatus of the class described, a receiving table, a discharge table, a carrier mounted for lateral reciprocating movement from said receiving table to said discharge table and back to said receiving table, means for imparting such reciprocating movement to said carrier, a pair of grippers rotatably mounted on said carrier and having jaws adapted to be closed and opened, means for effecting closing and opening of said gripper jaws respectively when the carrier is in predetermined relationship to said receiving and discharge tables, thereby to enable said grippers to grip stacks of material on said receiving table and to transport said stacks to and deposit the same on said discharge table, said stacks being separably connected end to end when on said receiving table, means for effecting rotation of said grippers through arcs of approximately ninety degrees and respectively in opposite directions intermediate the closing and opening of the jaws thereof so as to cause said stacks of material to be rotated in opposite directions relative to each other, whereby said connected ends are moved away from each other to disconnect the stacks and the latter are deposited on said discharge table in transversely extending relationship to the positions of the respective stacks on said receiving table, said tables each having a stack supporting portion comprising a plurality of spaced fingers, and said gripper jaws comprising upper and lower jaws and the lower jaws of said grippers embodying a plurality of upstanding, spaced, post-like projections which are movable into the spaces between said table fingers so as to be engageable with spaced portions of the under side of a stack of material resting on said table fingers.

9. In apparatus of the class described, the combination of receiving and discharge tables each having a material stack supporting portion comprising a plurality of spaced fingers, a carrier mounted for reciprocating movement from said receiving table to said discharge table and back to said receiving table, means for effecting such movement of said carrier, a stack gripper mounted on said carrier and comprising upper and lower jaws, said lower jaw being mounted for closing and opening movement toward and from said upper jaw and comprising a plurality of upstanding, spaced, post-like projections which are movable laterally into and upwardly through the spaces between said table fingers so as to be engageable with spaced portions of stacks of material positioned on said table fingers and operative to lift such stacks from said receiving table fingers and to lower such stacks to said discharge table fingers, and means for imparting opening and closing movement to said lower jaw.

10. In apparatus of the class described, the combination of receiving and discharge tables each having a material stack supporting portion comprising a plurality of spaced fingers, a carrier mounted for movement from said receiving table to said discharge table and back to said receiving table, means for effecting such movement of said carrier, a stack gripper mounted on said carrier and comprising upper and lower jaws, said lower jaw being mounted for closing and opening movement toward and from said upper jaw and comprising a plurality of upstanding, spaced, post-like projections which are movable laterally into and upwardly through the spaces between said table fingers so as to be engageable with spaced portions of stacks of material positioned on said table fingers and operative to lift such stacks from said receiving table fingers and to lower such stacks to said discharge table fingers, means for imparting opening and closing movement to said lower jaw, said upper jaw comprising a plurality of spaced fingers for engaging the tops of the stacks, spaced compressors movable downwardly to engage the top of the stack and to compress the same on the receiving table fingers, said members being located so as to permit the fingers of said upper jaw to move into the spaces between said members into overlying relationship to the material stack on said receiving table fingers preparatory to closing of said jaws on the stack, and means for actuating said compressors.

11. In apparatus of the class described, the combination of receiving and discharge tables each having a material stack supporting portion comprising a plurality of spaced fingers, a carrier mounted for reciprocating movement from said receiving table to said discharge table and back to said receiving table, means for effecting such movement of said carrier, a stack gripper mounted on said carrier and comprising upper and lower jaws, said lower jaw being mounted for closing and opening movement toward and from said upper jaw and comprising a plurality of upstanding, spaced, post-like projections which are movable laterally into and upwardly through the spaces between said table fingers so as to be engageable with spaced portions of stacks of material positioned on said table fingers and operative to lift such stacks from said receiving table fingers and to lower such stacks to said discharge table fingers, means for imparting opening and closing movement to said lower jaw, said upper jaw comprising a plurality of spaced fingers for engaging the tops of the stacks, means movable downwardly between said jaw fingers to engage the top of the stack and to compress the same on the receiving table fingers thereby to facilitate lateral movement of said gripper jaws into embracing relationship to the material stack on said receiving table fingers preparatory to closing of said jaws on the stacks, a wiper movable transversely over the tip of the stack preliminarily to actuation of said compressing means to counteract any tendency of the top material in the stack to curl back on the stack, and means for actuating said wiper.

12. In apparatus of the class described, the combination of a receiving table, a discharge table, a carrier mounted for lateral movement and having jaws for gripping a stack of material, means for effecting lateral reciprocating movement of said carrier from said receiving table to said discharge table and back to said receiving table, means for effecting closing and opening of said carrier jaws respectively when the carrier is in predetermined relationship to said receiving and discharge tables, thereby to enable said carrier to grip a stack of material on said receiving table and to transport said stack to and deposit the same on said discharge table, a stack holder movable toward and from the stack receiving surface of said discharge table for clamping to said discharge table, a stack of material deposited on said table by said carrier, thereby to prevent the stack from following said carrier jaws back to said receiving table, and means for moving said stack holder to and from clamping position in operatively synchronized relation to the deposit of stacks of material on said discharge table.

13. In apparatus of the class described, a receiving table, a pair of mutually spaced discharge table portions, two pairs of gripper jaws adapted to be closed and opened to grip and release stacks of material, said jaw pairs being mounted for rotary movement from predetermined, aligned, stack gripping positions adjacent said receiving table to predetermined separated delivery positions respectively adjacent said spaced discharge table portions, means for effecting closing of said gripper jaws when said jaws are in said predetermined position relative to said receiving table, thereby to enable said jaws to grip aligned stacks of material on said receiving table, said aligned stacks being separably connected end to end, means for effecting rotary movement of said jaw pairs intermediate the closing and opening of the jaws thereof so as to cause the separably connected ends of said aligned, separably connected stacks of material to be moved away from each other and the stacks thereby separated into relatively independent stacks and the independent stacks transported respectively to said discharge table portions, and means for effecting opening of said jaws when in predetermined positions relative to said discharge table portions to thereby deliver said stacks respectively to said discharge table portions.

14. In apparatus of the class described, a pair of grippers each comprising upper and lower cooperative jaws which are adapted to be closed to grip a bundle of sheet material which embodies a pair of potential stacks of material separably connected end to end, means for effecting closing of said jaws to grip a bundle as aforesaid, means mounting said grippers for movement in predetermined stack transporting directions and also for rotary stacks separating movement, means for effecting simultaneous movement of said grippers in said predetermined directions and rotary movement thereof in mutually opposed directions, thereby to cause said grippers to transport the material gripped thereby and also to move away from each other so as to separate said potential stacks of material from each other, whereby said bundle is converted into a pair of mutually independent stacks, and means for opening said grippers to release said independent stacks upon the completion of said transporting movement.

15. In apparatus for separating into individual paper sheet stacks, a paper sheet bundle comprising a pair of potential stacks of paper sheets separably interconnected edge to edge, a gripping station, a pair of spaced apart grippers respectively adapted to be opened and closed to receive and to grip said potential stacks on opposite sides of the interconnected edges thereof, means for delivering a paper sheet bundle to said gripping station in a direction generally transverse to a line drawn between said pair of grippers, gripper actuating means operative to open said grippers and move the same to said gripping station for receiving and gripping a bundle as aforesaid, said actuating means being also operative to close said gripper on a bundle delivered to said gripping station and to effect simultaneous rotary movement of said grippers respectively in opposite direction to effect movement of said grippers away from each other to thereby separate said bundle into mutually independent stacks of paper sheets.

References Cited in the file of this patent

UNITED STATES PATENTS

| Number | Name | Date |
|---|---|---|
| 991,148 | Goldman | May 2, 1911 |
| 1,297,444 | Christensen | Mar. 18, 1919 |
| 1,467,020 | Tzibides | Sept. 4, 1923 |
| 1,847,812 | Burton et al. | Mar. 1, 1932 |
| 1,885,897 | Christensen | Nov. 1, 1932 |
| 1,964,085 | Schmitt | June 26, 1934 |
| 2,017,462 | Kleineberg | Oct. 15, 1935 |
| 2,154,992 | Pearson | Apr. 18, 1939 |
| 2,251,158 | Ogrodowy | July 29, 1941 |
| 2,289,161 | Zalkind | July 7, 1942 |
| 2,427,515 | Swain | Sept. 16, 1947 |